(12) United States Patent
Odendall

(10) Patent No.: US 10,450,986 B2
(45) Date of Patent: Oct. 22, 2019

(54) METHOD FOR DIAGNOSING AN EXHAUST GAS SYSTEM OF AN INTERNAL COMBUSTION ENGINE

(71) Applicant: AUDI AG, Ingolstadt (DE)

(72) Inventor: Bodo Odendall, Lenting (DE)

(73) Assignee: AUDI AG, Ingolstadt (DE)

( * ) Notice: Subject to any disclaimer, the term of this patent is extended or adjusted under 35 U.S.C. 154(b) by 236 days.

(21) Appl. No.: 15/661,093

(22) Filed: Jul. 27, 2017

(65) Prior Publication Data

US 2018/0030915 A1    Feb. 1, 2018

(30) Foreign Application Priority Data

Jul. 27, 2016 (DE) .......................... 10 2016 213 767

(51) Int. Cl.
*F02D 41/22* (2006.01)
*F01N 3/10* (2006.01)
*F01N 11/00* (2006.01)

(52) U.S. Cl.
CPC ........... *F02D 41/222* (2013.01); *F01N 3/101* (2013.01); *F01N 11/007* (2013.01); *F01N 2560/025* (2013.01)

(58) Field of Classification Search
CPC ............... F02D 41/1401; F02D 41/222; F02D 41/1454; F01N 3/101; F01N 11/007; F01N 2560/025
See application file for complete search history.

(56) References Cited

U.S. PATENT DOCUMENTS

| 6,600,998 B1 | 7/2003 | Majima et al. |
| 2003/0154709 A1 | 8/2003 | Kadowaki et al. |
| 2005/0132698 A1* | 6/2005 | Nagaoka ............ B01D 53/9431 60/295 |
| 2013/0202507 A1* | 8/2013 | Echoff .................. F01N 3/0814 423/213.5 |

(Continued)

FOREIGN PATENT DOCUMENTS

| CN | 105649811 A | 6/2016 |
| DE | 102008027575 A1 | 12/2009 |

(Continued)

OTHER PUBLICATIONS

California Code of Regulations, Final Regulation Order, §1971.1 of Title 13, "On-Board Diagnostic System Requirements—2010 and Subsequent Model-Year Heavy-Duty Engines", 127 pgs.

(Continued)

*Primary Examiner* — Patrick D Maines
(74) *Attorney, Agent, or Firm* — Maier & Maier, PLLC

(57) ABSTRACT

The present invention relates to a method for diagnosing an exhaust gas system of an internal combustion engine with at least one three-way catalytic converter, at least one four-way catalytic converter and at least one binary lambda sensor, wherein during the testing of the functional operability of the at least one binary lambda sensor and/or of at least one four-way catalytic converter on the basis of a lambda change with a changeover of the internal combustion engine from a lean operation to a rich operation following a thrust operation clearing out at least one three-way catalytic converter occurs.

6 Claims, 2 Drawing Sheets

(56) References Cited

U.S. PATENT DOCUMENTS

2015/0204258 A1\* 7/2015 Kumar ................ F01N 11/007
                                                              60/274
2015/0233315 A1\* 8/2015 Kumar ................ F02D 41/0295
                                                              60/274
2017/0370268 A1\* 12/2017 Meier .................... F01N 3/035

FOREIGN PATENT DOCUMENTS

| DE | 102009000410 A1 | 7/2010 |
| DE | 102011106933 A1 | 1/2013 |
| EP | 0 887 522 A1 | 12/1998 |
| JP | 2001-020726 A | 1/2001 |
| JP | 2001-115879 A | 4/2001 |
| WO | 102006041477 A1 | 3/2008 |

OTHER PUBLICATIONS

Chinese Office Action dated Apr. 2, 2019, in connection with corresponding CN Application No. 201710615562.0 (10 pgs., including English translation).

\* cited by examiner

METHOD FOR DIAGNOSING AN EXHAUST GAS SYSTEM OF AN INTERNAL COMBUSTION ENGINE

FIELD

The present invention relates to a method for diagnosing an exhaust gas system of an internal combustion engine and to an exhaust gas system.

BACKGROUND

During the operation of an internal exhaust gas system, exhaust gases are generated which must be subsequently treated by means of an exhaust gas system in order to make the operation of the internal combustion engine compliant with environmental regulations, such as for examples the regulations for exhaust gas limits. In this case, the success of the post-treatment depends on the functional operability of each component of the exhaust gas system, such as for example a catalytic converter or a lambda sensor. As a result of the tightening of exhaust gas limits everywhere in the world, the requirements on the diagnosis and on the operation of gas exhaust gas system are steadily rising.

Since in order to test an exhaust gas system, both operating conditions with a rich mixture as well as operating conditions with a lean mixture of respective internal combustion engines are required, a diagnosis of an exhaust gas system of the internal combustion engine which is independent of the operating point regularly leads to additional consumption and thus also to worsening emission values of the internal combustion engine.

In the German document DE 10 2008 027 575 A1 is disclosed a diagnostic method for a catalytically effective gas exhaust purification element of an internal combustion engine.

A method for testing a particle filter for exhaust gases from a gasoline engine is disclosed in the German document DE 10 2011 106 933 A1.

The German document DE 10 2009 000 410 A1 discloses a method and a device for diagnosing an exhaust post-treatment device by means of voltage sequences of a number of lambda sensors.

From U.S. Pat. No. 6,600,998 B1 is known a method according to which 02 saturation is detected and when a threshold value is reached, the control over the engine is correspondingly adjusted. At the same time, the mixture is enriched during a predetermined period of time.

In the publication "*Wissenschaft Populär: Vier Wege zum sauberen Benzinmotor*" (Popular Science: Four Roads to a Clean Gasoline Engine), issued by BASF in December of 2010, is disclosed a catalytic converter system which removes the gaseous pollutants and soot particles from the exhaust gas. In this case, the three-way catalytic converter was expanded to a four-way catalytic converter so that solids can be removed from the exhaust gas, wherein only a small counter-pressure is built up.

Further, an OBD diagnostic system method is known from the US law described in the California Code of Regulations, § 1971.1, On-Board Diagnostic System Requirements—2010 and Subsequent Model Year Heavy-Duty Engine.

A method for dynamically diagnosing an exhaust sensor in an exhaust gas channel is known from the document DE 10 2006 041 477 A1.

Finally, from the document US 2003/0154709 A1 is known a diagnostic device for an exhaust gas sensor, which is arranged in a diagnostic device for diagnosing a sensor abnormality and which evaluates the sensor based on the exhaust gases after the combustion engine has been turned off.

SUMMARY

Against this background is proposed a method for diagnosing an exhaust gas system of an internal combustion engine having at least one three-way catalytic converter, at least one four way-catalytic converter and at least a binary lambda sensor, wherein a test of the functional operability of the at least one binary lambda sensor and/or of at least one four-way catalytic converter is performed on the basis of a lambda change when the internal combustion engine is switched from a lean operation to a rich operation following a thrust operation for clearing at least one three-way catalytic converter.

Embodiments will become evident from the description and from the dependent claims.

The proposed method is used in particular for a diagnosis, which is to say to test the performance of at least one catalytic converter, such as for example one four-way catalytic converter, and at least one lambda sensor arranged in the direction of the flow of an exhaust gas in an internal combustion engine after a respective catalytic convertor, i.e. a post-cat sensor, in particular a binary lambda sensor.

Under the term Nernst voltage is to be understood in the context of the present invention a voltage generated by the lambda sensor that is increased when the lambda sensor is exposed to a rich mixture, which is to say a mixture having a high content of fuel or with a low lambda value, and which is reduced when the lambda sensor is exposed to a lean mixture, i.e. a mixture having a high content of oxygen or a high lambda value.

Under the term "rich operation" is in the context of the present invention to be understood an operational state of an internal combustion engine in which the internal combustion generates an exhaust gas that has a high content of fuel. Accordingly, under the term "lean operation" is in the context of the present invention to be understood an operational state of an internal combustion engine in which the internal combustion engine generates exhaust gas that has a low fuel content.

Under a measuring value of a lambda sensor is in the context of the present invention to be understood in particular a Nernst voltage generated by the lambda sensor at a respective point in time.

Under a linear lambda sensor is in the context of the present invention to be understood in particular the measurement range of a lambda sensor which covers the measurement range of a lambda sensor from approximately 0.7 to 4 and which generates a measurement signal that is substantially proportional to respective measured values.

Under a binary lambda sensor is in the context of the present invention to be understood a lambda sensor, such as for example a discrete-level sensor, which in particular generates in the measuring range around $\lambda=1$ a rapidly changing signal when an exhaust mixture to be measured becomes richer or leaner, which is to say when it contains more or less fuel.

Under the formulation "clearing out the catalytic converter" is in the context of the present invention to be understood a process in which an oxygen storage device of a catalytic converter is cleared out by introducing into it rich gas, which is to say a rich mixture that is discharged into the catalytic converter to enable an improved performance of the catalytic converter for the exhaust gas that is introduced into the catalytic converter.

Under thrust operation is to be understood in the context of the present invention an operation of a motor vehicle in which the motor vehicle is driven by an already generated thrust and/or by gravity and when an internal combustion engine of the motor vehicle is not used to generate the drive energy.

In order to a diagnose the efficiency of the fuel and of the exhaust gas, of an exhaust gas system, or of the catalytic converters and respective lambda sensors of an exhaust gas system, it is according to the invention provided that a rich operation is used which follows a thrust operation of an internal combustion engine in order to test the catalytic converters, in particular a four-way catalytic converter and lambda sensor of a four-way catalytic converter and lambda sensors of a gas exhaust gas system. In this case it is provided that a binary lambda sensor, which is for example arranged in the flow direction of an exhaust gas generated by an internal combustion engine after a respective catalytic converter is classified as faulty when an adjustment is made at a point in time or in a time window of a change in an operating phase of the internal combustion engine from a lean operating state, e.i. a lean operation, to a rich operating state, i.e. a rich operation, by means of the values detected by the binary lambda sensor with respective predetermined threshold values, so that the binary lambda sensor displays a filter inclination or a delay.

With the use provided according to the invention, a changeover of a respective internal combustion engine from a lean operation to a rich operation, in which a rich mixture, i.e. a rich gas, is conducted into a catalytic converter in order to "clear it out", i.e. to empty the oxygen storage device of the catalytic converter, it is possible to use the related changes of the gas exhaust values and the corresponding measurement values of respective lambda sensors in order to infer in this manner the state of a respective catalytic converter and/or of the lambda sensors. This means that due to a known conduct of exhaust gas, i.e. known exhaust gas parameters such as for example the lambda value at different points in time during clearing out of the catalytic converter, different expected values are known to be generated with measured values detected by the respective lambda sensors, and they may be used for example for an adjustment of the actual measured value with the appropriately selected threshold values. Accordingly, an examination of the fuel amount to be introduced for the lambda sensors independently of the catalytic converter, or of a corresponding rich operation, can be dispensed with, which increases the fuel efficiency and the emission efficiency of the internal combustion engine.

Furthermore, an additional amount of rich gas is introduced with the rich operation following the clearing out of the catalytic converter, i.e. an amount of rich mixture which is introduced into each catalytic converter that can be used for diagnosing an oxygen storage device of each catalytic converter, in particular of the four-way catalytic converter.

In a possible embodiment of a method described here it is provided that at least one binary lambda sensor arranged in the flow direction of an exhaust gas generated by the internal combustion engine is classified as faulty when an increase is displayed with a function of the values determined by means of the binary lambda sensor during a thrust operation taking place from a lean operation to a rich operation of the internal combustion engine following the lean operation in order to clear out the at least one three-way catalytic converter, and the increase is classified as faulty with at least one four-way catalytic converter when at least one exhaust gas generated by the internal combustion engine with a binary lambda sensor arranged after at least one four-way catalytic converter after a contribution of one predetermined rich gas amount creates a Nernst voltage above a second threshold value that is generated in the at least one four-way catalytic converter.

In the following, under the formulation "a function of [. . . ] values over time" is to be understood as a function that indicates a behavior or a course of corresponding values depending on the time.

In order to determine a filter inclination of each respective lambda sensor, it can be in particular provided that an increase of a function of the lambda values over time, during a transition from a lean operation to a rich operation, or during a transition from a rich operation to a lean operation of respective internal combustion engine, an adjustment is carried out with a threshold value. Accordingly, it is provided that the binary lambda sensor is classified as faulty when the increase is too small, i.e. when it corresponds to a small amount, so that a step response of the binary lambda sensor is only inadequate.

Furthermore, a respective catalytic converter of a respective gas exhaust gas system can be classified as faulty when it is found that an oxygen storage device of a respective catalytic converter no longer has a sufficient capacity to ensure a sufficient after-treatment of the exhaust gas. In order to diagnose the oxygen storage device arranged in the direction of the flow with the gas exhaust generated by a respective internal combustion engine and a four-way catalytic converter arranged after a three-way catalytic converter, after the internal combustion engine switches from a lean operation to a rich operation, clearing out of the three-way catalytic converter can be initiated with a predetermined amount of the rich gas in the four-way catalytic converter. If it turns out after the input of the predetermined amount of rich gas into the four-way catalytic converter, which is provided with at least one binary lambda sensor according to the invention which is arranged in particular in the direction of the flow generated by the gas exhaust created with the internal combustion engine after the four-way catalytic converter, or integrated in the four-way catalytic converter, that measured values are established that are above one of the predetermined threshold value, it can be assumed from this that the oxygen storage device of the catalytic converter no longer has a sufficient capacity and that the catalytic converter is to be classified as "faulty".

In order to provide the predetermined quantity of rich gas, it is in particular provided that each respective internal combustion engine is operated after a rich operation in order to clear out each respective catalytic converter in a rich operating mode for as long until the predetermined rich gas amount is reached in the four-way catalytic converter.

Conversely, it can be assumed that a respective catalytic converter should be classified as "good" when a binary lambda sensor arranged after the exhaust gas generated by a respective internal combustion engine, or after the catalytic converter, or integrated in the respective catalytic converter, determines a measured value that is below a respective threshold value, such as for example a Nernst value of 0.8 Volts. This means that the catalytic converter should be classified as "good" when it is capable of handling or converting the rich gas input so that the fuel content in the gas exhaust after the respective catalytic converter is below a predetermined threshold value. In this case, the threshold value can be predetermined in a fixed manner, or it can selected depending on the measured value determined by a lambda sensor arranged upstream of the respective catalytic converter in the gas exhaust that is generated by the internal combustion engine.

In the embodiment of the method described is provided that the four-way catalytic converter is impacted by an additional amount of rich gas, which is to say having a predetermined volume, after the three-way catalytic converter has been "cleared out" in a rich operation, i.e. after an oxygen storage device of the three-way catalytic converter has been emptied. With a rich operation phase of the respective internal combustion engine that follows or that is added to the process when the three-way catalytic converter is cleared out, a precisely defined amount of rich gas can be introduced into the four-way catalytic converter, by means of which the four-way catalytic converter is to be tested with respect to its functional capability. If a Nernst voltage is generated for the lambda sensor connected downstream of the four-way catalytic converter after the predetermined amount of rich gas has been introduced into the four-way catalytic converter, which is below a predetermined threshold value, it can be assumed that the four-way catalytic converter has an oxygen storage device that is provided with a greater amount than the predetermined amount of rich gas, i.e. that the four-way catalytic converter has an oxygen storage device that is suitable for converting at least the predetermined amount of rich gas, so that the four-way catalytic converter is classified as "good" or as being "in working condition." Accordingly, the four-way catalytic converter is to be classified as "faulty" or "bad" when the Nernst voltage that is reached by the lambda sensor arranged after the four-way catalytic converter displays values that are above the threshold value, which indicates that the four-way catalytic converter has an oxygen storage device that is not capable of converting the predetermined amount of rich gas. At the same time, the threshold value can be of course also selected for example depending on other lambda sensor arranged upstream of the four-way catalytic converter in the direction of the exhaust gas generated by the internal combustion engine.

In order to diagnose a respective lambda sensor, the progress of the values determined by the lambda sensor is evaluated. If an increase of a function is determined during a transition of an internal combustion engine from a thrust operation to a rich operation of the internal combustion engine following a thrust operation for the clearing out of the three-way catalytic converter according to the invention by means of values determined by the binary lambda sensor which are momentarily higher than a minimum amount in the form of a threshold value, the progress of the function is very steep, which suggest a good, abrupt conduct of the lambda sensor, so that the lambda sensor is classified as "good" or as being "in working condition." If the increase of the function is steep during the transition of the internal combustion engine from a thrust operation to a rich operation following the thrust operation but remains flat, i.e. a small gradient is indicated which is below a threshold value, it is possible to conclude from this that the lambda sensor responds sluggishly, or that a filter tendency is displayed and accordingly, this is to be qualified as "poor" or "faulty." It is in particular provided that the gradient of a function of the values of a Nernst voltage is determined over time at a turning point of the function.

Since a thrust operation following a rich operation for clearing out a respective catalytic converter of a respective internal combustion engine is in any case provided with a large amount of fuel, it is provided that a changeover from a lean operation following the thrust operation to a rich operation is used during the clearing out of the catalytic converter in order carry out an analysis of the gas exhaust gas system. Accordingly, no additional fuel is used in order to diagnose the exhaust gas system because it is used in any case for the clearing out of the catalytic converter.

Further, during the clearing out of the catalytic converter, i.e. during a process in which a catalytic converter or a particle filter is burnt out with a very rich mixture, a point in time of a changeover from a lean operation to a rich operation becomes known and this can be used for diagnosing lambda sensors that are used to distinguish between lean operations and rich operations.

Errors of a lambda sensor, such as for example signal filtering or signal shifting, can be detected by using a known transition in time from a lean operation to a rich operation.

In order to compensate for measured values determined with at least one lambda sensor with the input of a rich gas mixture, a control device can be provided on a respective gas exhaust gas system which chronologically records the respective operating states of an internal combustion engine and the measured values of respective lambda sensors and stores them in a storage device for an adjustment, for example with a predetermined threshold value.

In order to test the oxygen storage device storage capability of a catalytic converter, particularly suitable are operating states in which rich gas is introduced into the catalytic converter. If the catalytic converter is capable of conversion, i.e. for increasing the oxygen content in the rich gas, the catalytic converter has an ability to store an oxygen amount that is greater than a rich gas amount input in a given time period and it is therefore to be classified as "functional."

According to another possible embodiment of the method, the additional input of the rich gas amount into the at least one four-way catalytic converter occurs when at least one exhaust gas generated in the flow direction by an internal combustion engine with a lambda sensor arranged in front of at least one four-way catalytic converter after a changeover of the internal combustion engine from the lean operation to a rich operation following a thrust operation for clearing out at least one three-way catalytic converter, which generates a Nernst voltage that is above a predetermined threshold value.

In order to clear out the respective four-way catalytic converter by introducing an additional rich gas amount during the clearing out operation, or to test a respective three-way catalytic converter following the clearing out operation, it is advantageous when the additional rich gas amount is then introduced into the four-way catalytic converter when the three-way catalytic converter has been just emptied. In order to identify a point in time at which each respective three-way catalytic converter was just cleared out, a measured value or a current Nernst voltage can be detected by a lambda sensor arranged after the three-way catalytic converter, which is to say compensate for with a threshold value. If the current Nernst voltage has a value of 0.8 V during a clearing out process of the three-way catalytic converter, it can be assumed that the oxygen storage device of the catalytic converter has been emptied. If the actual Nernst voltage during a clearing out process has a value that is less than 0.8 V, it can be assumed that the oxygen storage device of the catalytic converter has not been emptied yet.

According to another possible embodiment of the present method, a signal delay is determined with at least one lambda sensor with the transition from rich to lean operation, wherein a time interval is determined between the occurrence of a maximum of a measured value by the at least one lambda sensor and a point in time is determined in which a changeover of the internal combustion engine occurs from a rich operation to a lean operation, so that for a rich operation is selected a rich operation following after the thrust operation of at least one catalytic converter.

In order to determine a signal delay of a lambda sensor from a rich to a lean phase and thus to evaluate the quality of the lambda sensor, this can be done so that for example a transition is provided from a rich to a lean phase, such as for example in order to clear out a catalytic converter, in a lean operating phase of a respective internal combustion engine, which is used for example for testing a respective lambda sensor, and so that a signal change of the respective lambda sensor is examined at this point in time. If the time interval between the changeover of the operating phase of the internal combustion engine deviates for example from the respective gas running times, the respective lambda sensor indicates a signal delay and thus it must be classified, depending on the duration of the delay, as "poor" or "faulty."

According to another possible embodiment of the method, a signal delay is determined by at least one lambda sensor from the rich to the lean phase, wherein a time interval between an occurrence of a minimum of a measured value of the at least one lambda sensor and a point in time in which a changeover of the internal combustion engine occurs from a lean operation to a rich operation is determined, so that for a rich operation is selected the rich operation following after the thrust operation for clearing out at least one catalytic converter.

In order to detect a signal delay of a lambda sensor during the changeover of an operating phase of a respective internal combustion engine from the lean to the rich phase, the internal combustion engine is switched to the lean operation and after that to the rich operation, so as to for example clear out the catalytic converter. By matching a point in time of a signal change, i.e. of a changeover from a low Nernst voltage to a continuously rising Nernst voltage, with a point in time of an input of fuel that is for example stored in a control device in the internal combustion engine to generate the rich operation, it is possible to infer a shift, which is to say a signal delay of respective lambda sensors.

Furthermore, the present invention relates to an exhaust gas system for an internal combustion engine having at least one three-way catalytic converter, at least one four-way catalytic converter, at least one lambda sensor arranged downstream of the at least one four-way catalytic converter in the flow direction of exhaust gas generated by the internal combustion engine, and a control device, wherein the control device is configured to classify at least one binary lambda sensor as faulty when a function displays over time a gradient during a transition of the internal combustion engine from a thrust operation followed by a rich operation for clearing out at least on three-way catalytic converter if the gradient is below a predetermined threshold value, and wherein the control device is further configured to classify the at least one four-way catalytic converter as faulty when the at least one binary lambda sensor generates after an input of a predetermined rich gas amount in the at least one four-way catalytic converter a Nernst voltage above a second threshold value.

The gas exhaust gas system described above is in particular used for carrying out the method described above.

In a possible embodiment of the gas exhaust gas system described above, the internal combustion engine is a gasoline engine.

In another possible embodiment of the gas exhaust gas system described above, at least one binary lambda sensor is integrated in the three-way catalytic converter and/or in a four-way catalytic converter.

Other advantages and embodiments of the invention will become evident from the description and from the attached figures.

It goes without saying that the features named above and those that will still be explained below can be used not only in the identified combinations, but also alone, without deviating from the scope of the present invention.

BRIEF DESCRIPTION OF THE DRAWINGS

The invention is schematically illustrated based on embodiments in the figures and schematically described in detail with reference to the figures.

The figures are described in a contiguous and general manner. The same reference symbols are used for the designation of the same features.

DETAILED DESCRIPTION OF THE DRAWINGS

Figure 1:
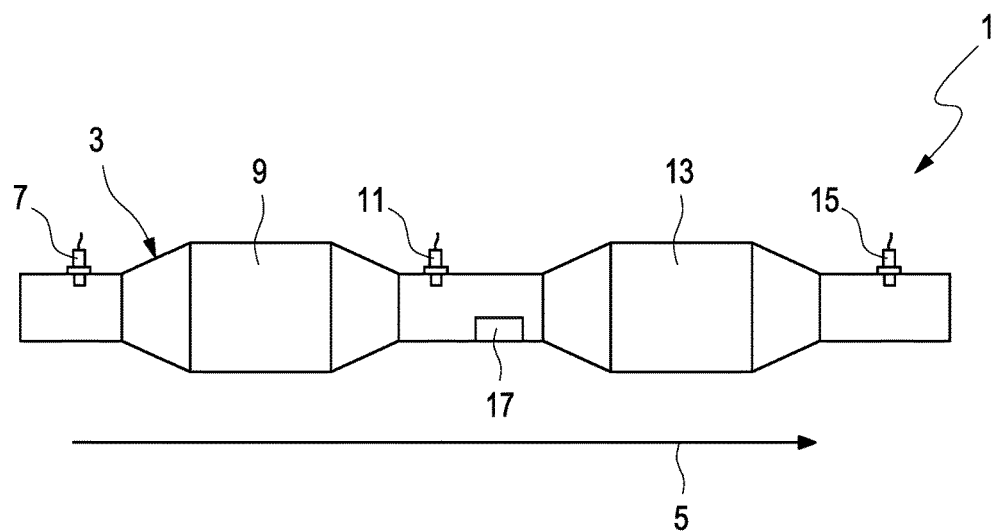
FIG. 1 shows a schematic representation of a possible embodiment of a gas exhaust gas system according to the invention.

FIG. 1 illustrates a gas exhaust gas system 1, which is connected to an internal combustion engine. The internal combustion engine, not shown, generate exhaust gas which flows through the gas tract 3 in the flow direction as indicated by the arrow 5. During its passage through the gas exhaust 3, the gas exhaust first flows to a linear gas exhaust sensor 7 which detects a composition of the gas exhaust or a fuel content in the gas exhaust. After the linear gas exhaust sensor 7, the gas exhaust flows through a three-way catalytic converter 9 and after that through a binary lambda sensor 11, wherein the binary lambda sensor 11 can also be integrated in the three-way catalytic converter 9.

During its passage in the direction toward the exhaust, the exhaust gas passes through a four-way catalytic converter 13, i.e. a particle filter which is provided with a catalytically active layer made of a noble metal. Before the gas exhaust leaves the gas exhaust tract 3, the composition of the gas exhaust is determined by a binary lambda sensor 15 that can be optionally also provided.

In order to test the three-way catalytic converter 9, the four-way catalytic converter 13 and the lambda sensors 11 and 15, it is provided that respective values determined by the lambda sensor 7, 11 and 15 are interpreted by means of a control device 17 with respect to their relation to respective operational phases of the internal combustion engine.

Figure 2:
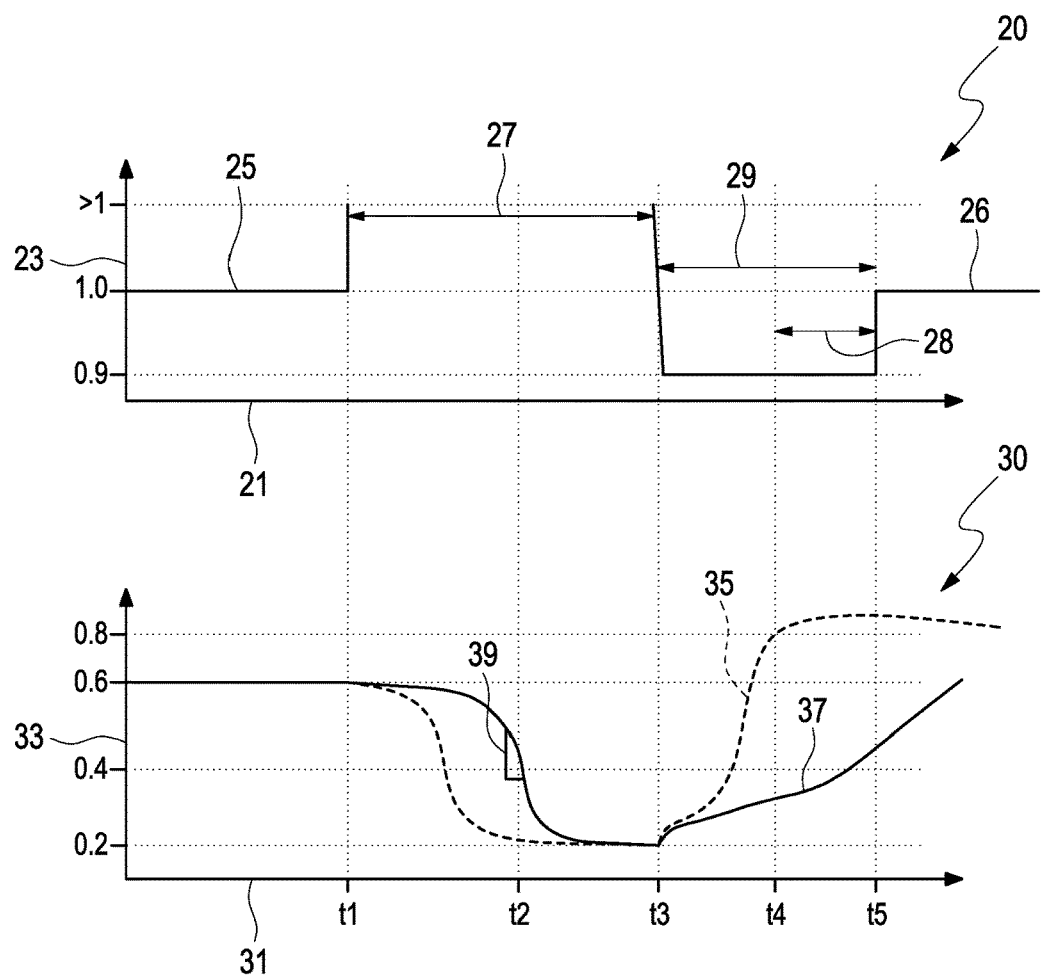
FIG. 2 shows a schematic representation of the progress in a possible embodiment of the method according to the invention.

FIG. 2 shows a diagram 20, which is plotted over time on the horizontal axis 21 with a lambda value before the catalytic converter indicated on the vertical axis 23, which is to say a lambda value determined as shown in the FIG. 1. Starting from the drive phase of an internal combustion engine, which is indicated by the line 25, the internal combustion engine is switched on at the point t1 as indicated by arrow 27, in which the internal combustion engine does not generate any or any significant input of fuel in the respective gas exhaust. At the point of the thrust operation which is indicated by arrow 27, the internal combustion engine is switched to a rich operation at the point t3 as indicated by arrow 29 in order to clear out a catalytic converter, such as the three-way catalytic converter 9 illustrated in FIG. 1, which is to say in order to empty an oxygen storage device of the three way catalytic converter 9. Accordingly, the lambda value is increased at the beginning of the clearing out operation, only to stagnate during the clearing out operation when a plateau is reached at point T4 so that after that, it is increased again at point t5 as indicated by line 26.

During the operating phase indicated by the arrow 28, the internal combustion engine is left in the rich operating mode so as to generate a predetermined amount of rich exhaust gas by means of which the four-way catalytic converter is to be tested as explained below.

Furthermore, FIG. 2 shows a diagram 30 in which Nernst voltage is plotted in Volts on the vertical axis 33 over time indicated on the horizontal axis 31 (in seconds). Line 35 represents the course of a Nernst voltage of a lambda sensor 11 which is arranged before the four-way catalytic converter 13 and after the three-way catalytic converter 9.

Line 37 represents the course of a Nernst voltage of the lambda sensor 15 which is arranged after the four-way catalytic converter 13. In order to test the lambda sensor 15 for a filter inclination, the gradient 39 of the Nernst voltage can be evaluated according to the line 37 after a transition from a rich operation to a lean operation. Such a transition from a rich operation to a lean operation can be occur for example during a transition from a driven operation phase to a thrust operation as shown between the points t1 and t3. Due to a latency of the lambda sensor 15, the progress level 37 of the Nernst voltage is decreased first at point t2 and not already at point t1. If the gradient 39 of the progress level 37 of the Nernst voltage of the lambda sensor 15 is greater than a predetermined threshold value, the lambda sensor 15 indicates a good step response and the can be classified as "good" or as being "in working condition". If the gradient is below the threshold value, this indicates a filter inclination of the lambda sensor 15 so that it will be classified as "poor" or "unable to operate".

It is noticeable that the changeover to the thrust operation at point t1 is detected by the lambda sensor 11 earlier than by the lambda sensor 15 which is further away from the internal combustion engine in the flow direction, as shown in a comparison of the corresponding lines 35 and 37. At point t3, the internal combustion engine is switched to a rich operating mode in order to clear out the three-way catalytic converter 9, which is to say to empty the oxygen storage device of the three-way catalytic converter 9. Accordingly, the Nernst voltage levels generated by the lambda sensors 11 and 15 are increased at point t3, wherein the Nernst voltage of the lambda sensor 11 is steeper as shown by line 35 and it rises higher than the Nernst voltage of the lambda sensor 15 shown by line 37.

At point t4, the Nernst voltage of the lambda sensor 11 exceeds the value of 0.8 volts. Accordingly, it can be assumed from this that at this point in time, an oxygen storage device of the three-way catalytic converter 9 has been emptied. Up until the point t5, the internal combustion engine operates in a rich operating mode, which is to say in an operating mode that generates a rich exhaust gas as indicated by the arrow 28 in the diagram 20. The internal combustion engine is operated in the rich operating mode for as long until a predetermined amount of exhaust gas is provided and introduced into the four-way catalytic converter 13. When after the introduction of the predetermined amount of exhaust gas the Nernst voltage no longer exceeds a threshold value of the lambda sensor 15 of for example 0.8 Volts, it can be assumed that the four-way catalytic converter 13 has an oxygen storage device that is greater than what is required from the oxygen storage device for converting the predetermined amount of rich gas. Accordingly, the four-way catalytic converter is to be classified as "good" or as being in "operating condition". In this case, the predetermined amount of generated exhaust gas or the duration of the rich operating phase is selected for example as a function of respective requirements on the exhaust gas.

Figure 3:
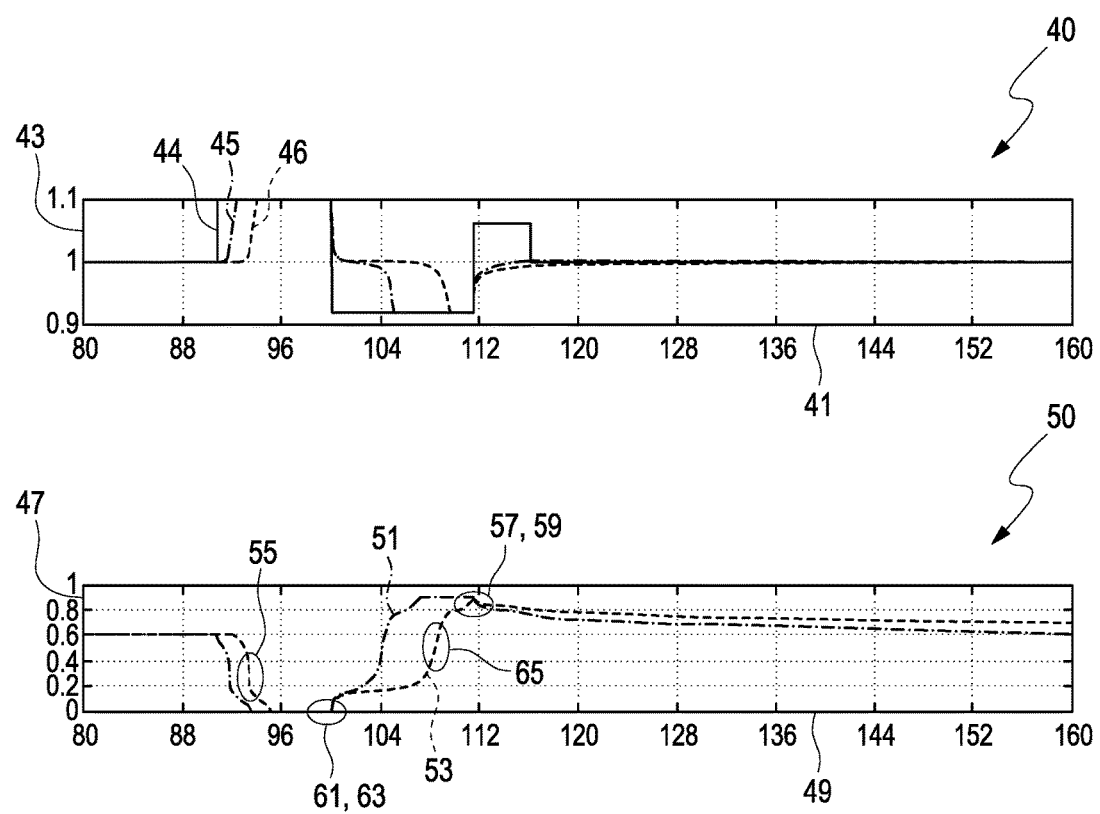
FIG. 3 is another schematic representation of the progress in a possible embodiment of the method according to the invention.

FIG. 3 shows a possible method for determining signal delays of the lambda sensors 11 and 15. In diagram 40 are plotted on the horizontal axis 41 indicating the time (in seconds) and on the vertical axis 43 indicating a lambda value three lines 44, 45, 46, wherein line 44 shows the course of a combustion air ratio in front of a three-way catalytic converter 9, line 45 shows the course of a combustion air ratio after the three-way catalytic converter 9, and line 46 represents the course of a combustion air ratio after the four-way catalytic converter 9.

It can be seen from the diagram 40 that the internal combustion engine is switched on approximately at the second 92 to a lean operation so that a combustion air ratio, i.e. $\lambda$, is increased in front of the three-way catalytic converter 9 and, with a delay, after the four-way catalytic converter 13. Approximately at the second 100, the internal combustion engine is operated in a rich operating mode for as long until the lambda sensor 15 generates after the four-way catalytic converter a Nernst voltage of approximately 0.8 Volts.

Further, FIG. 3 shows a diagram 50 which plots on the vertical axis 47 the Nernst voltage over the horizontal axis 49 indicating the time (in seconds).

Line 53 shows a course of the Nernst voltage of the lambda sensor 15 after the four-way catalytic converter 13 and line 51 shows a course of the Nernst voltage of the lambda sensor 11 after the three-way catalytic converter 9 or before the four-way catalytic converter 13.

When the operating phase of the internal combustion engine is changed at the second 92 to a lean operation, the Nernst voltages of the lambda sensors 11 and 15 are also lowered so that by means of a gradient 55 of for example the line 53, a filter tendency of the lambda sensor 15 can be discontinued. For this purpose, the gradient 55 can be adjusted for example with a predetermined threshold value. If an amount of the gradient 55 is greater than the threshold value, a good step response of the lambda sensor 15 is to be assumed, so that the lambda sensor 15 should be classified as "good" or as being "in good operating order."

In order to determine the signal delay of the lambda sensor 11 and 15, the internal combustion engine is switched on at the minute 111 to a lean operating mode until the catalytic converter 9 is filled up to approximately 50% to 70%. By means of a time offset of the occurrence of the respective maxima 57 of the line 51 and 53 to the point in time when the internal combustion engine is switched to the lean operation, which is to say approximately at the second 111, the reaction time and accordingly also the signal delay 59 or the inertia of the lambda sensor 11 and 15 can be determined with a lambda changeover from a rich to a lean operation.

A signal delay 61 of the lambda sensor 11 and 15 with a lambda changeover from a lean to a rich can be determined during a transition of the internal combustion engine from the lean operation to the rich operation via a time shift of the occurrence of the respective minima 63 of the lines 51 and 53 to the point in time when the internal combustion engine is switched on in the rich operation approximately at the second 100.

A filter tendency of the lambda sensor 15 during a changeover of an operating state of the internal combustion engine from the lean to the rich operation can be determined for example on the basis of the gradient 65. If the gradient 65, i.e. in particular an amount of the gradient 65, is below a predetermined threshold value so that the line 53 is particularly flat, the lambda sensor 15 is sluggish and it should therefore be classified as "poor" or as "unable to operate."

The invention claimed is:

1. A method for diagnosing an exhaust gas system of an internal combustion engine provided with at least one three-way catalytic converter, at least one four way catalytic converter and at least one binary lambda sensor comprising:
   testing a functional operability of the at least one binary lambda sensor and the at least one four-way catalytic converter on the basis of a lambda change, wherein during the testing, a changeover of the internal combustion engine from a lean operation to a rich operation occurs following a thrust operation for clearing out the at least one three-way catalytic converter,
   classifying a first binary lambda sensor that is arranged in a flow direction of the exhaust generated by the internal combustion engine after the at least one four-way catalytic converter as faulty when a function of lambda values are determined by the first binary lambda sensor over time, such that during the changeover of the internal combustion engine from the lean operation taking place during the thrust operation to the rich operation following the lean operation of the internal combustion engine to clear out the at least one three-way catalytic converter, an increase of the function of lambda values is displayed which is below a predetermined first threshold value,
   classifying the at least one four-way catalytic converter as faulty, when the first binary lambda sensor generates, after the input of a predetermined rich gas amount in the at least one four-way catalytic converter, a Nernst voltage above a second threshold value, and
   determining a signal delay by the first binary lambda sensor during a changeover from the rich operation to the lean operation, wherein a time interval is determined between an occurrence of a maximum of measured values of the first binary lambda sensor and a point in time at which the changeover of the internal combustion engine occurs from the rich operation to the lean operation, wherein the rich operation is selected following the thrust operation for clearing out the at least one three-way catalytic converter.

2. The method according to claim 1, wherein an additional input of a rich gas amount in the at least one three-way catalytic converter occurs when a second binary lambda sensor that is arranged after the at least one three-way catalytic converter and before the at least one four-way catalytic converter generates a Nernst voltage which is above a predetermined threshold value.

3. The method according to claim 1, wherein the second threshold value is a Nernst voltage of 0.8 Volts.

4. The method according to claim 1, wherein the signal delay of the first binary lambda sensor is detected during the changeover from the rich operation to the lean operation, wherein a time interval occurs between the occurrence of a minimum of measured values of the first binary lambda sensor and a point in time at which the changeover of the internal combustion engine from the lean operation to the rich operation occurs, so that the rich operation is selected following the thrust operation for clearing out at least one three-way catalytic converter.

5. An exhaust gas system for an internal combustion engine, comprising: at least one three-way catalytic converter, at least one four-way catalytic converter, at least one binary lambda sensor arranged after the at least one four-way catalytic converter in the flow direction of at least one internal combustion engine and a control device, wherein the control device is configured to classify the at least one binary lambda sensor as faulty when a function of the values determined over time by the least one binary lambda sensor during a changeover of the internal combustion engine to a rich operation following a thrust operation for clearing out the at least one three-way catalytic converter displays a gradient that is below a predetermined threshold value, and wherein the control device is further configured to classify the at least one four-way catalytic converter as faulty when the at least one binary lambda sensor after the input of a predetermined amount of rich gas in the at least one four-way catalytic converter generates a Nernst voltage above a second threshold value.

6. The exhaust gas system according to claim 5, wherein the internal combustion engine is a gasoline engine.

* * * * *